(12) United States Patent
Higashiyama et al.

(10) Patent No.: US 10,996,479 B2
(45) Date of Patent: May 4, 2021

(54) DISPLAY DEVICE, DISPLAY CONTROL METHOD, AND STORAGE MEDIUM

(71) Applicant: HONDA MOTOR CO., LTD., Tokyo (JP)

(72) Inventors: Masafumi Higashiyama, Wako (JP); Takuya Kimura, Wako (JP); Shinji Kawakami, Wako (JP); Tatsuya Iwasa, Wako (JP); Yuji Kuwashima, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 16/581,910

(22) Filed: Sep. 25, 2019

(65) Prior Publication Data
US 2020/0103665 A1 Apr. 2, 2020

(30) Foreign Application Priority Data
Oct. 1, 2018 (JP) .............................. JP2018-186862

(51) Int. Cl.
*G02B 27/01* (2006.01)
*B60K 35/00* (2006.01)

(52) U.S. Cl.
CPC .......... *G02B 27/0179* (2013.01); *B60K 35/00* (2013.01); *B60K 2370/1529* (2019.05);
(Continued)

(58) Field of Classification Search
CPC ........ G02B 27/0179; G02B 2027/0154; G02B 2027/0183; G02B 27/0075;
(Continued)

(56) References Cited

U.S. PATENT DOCUMENTS

2017/0290131 A1* 10/2017 Ito ......................... H04L 9/0822

FOREIGN PATENT DOCUMENTS

CN 108496108 9/2018
JP 62-225429 10/1987
(Continued)

OTHER PUBLICATIONS

Japanese Office Action for Japanese Patent Application No. 2018-186862 dated Mar. 17, 2020.

*Primary Examiner* — Mark W Regn
(74) *Attorney, Agent, or Firm* — Amin, Turocy & Watson, LLP

(57) ABSTRACT

A display device includes: a light projection device configured to project light; an optical mechanism configured to be able to adjust an optical distance to a virtual image; a concave mirror configured to reflect light toward a reflector; a first actuator configured to adjust the optical distance; a second actuator configured to adjust a reflection angle of the concave mirror; and a control device configured to determine a target optical distance and a target reflection angle based on a vehicle state or a situation around a vehicle, control the first actuator such that the optical distance approaches the target optical distance, and control the second actuator such that the reflection angle approaches the target reflection angle. The control device performs predetermined control such that the virtual image becoming a double image when the target optical distance is equal to or less than a predetermined distance is curbed.

5 Claims, 9 Drawing Sheets

(52) U.S. Cl.
CPC ... *B60K 2370/349* (2019.05); *B60R 2300/205* (2013.01); *B60R 2300/308* (2013.01); *G02B 2027/0183* (2013.01)

(58) Field of Classification Search
CPC ........ G02B 2027/0127; G02B 27/0101; G02B 27/0149; B60K 35/00; B60K 2370/1529; B60K 2370/349; B60R 2300/205; B60R 2300/308; B60R 1/00
See application file for complete search history.

(56) References Cited

FOREIGN PATENT DOCUMENTS

| | | | |
|---|---|---|---|
| JP | 07-017301 | 1/1995 | |
| JP | 2017-091115 | 5/2017 | |
| JP | 2018-146882 | 9/2018 | |
| JP | 2019-217941 | 12/2019 | |
| WO | 2017/090568 | 6/2017 | |
| WO | 2018/043558 | 3/2018 | |
| WO | 2018/070193 | 4/2018 | |
| WO | WO-2018070193 A1 * | 4/2018 | ............. G01C 21/26 |

* cited by examiner

DISPLAY DEVICE, DISPLAY CONTROL METHOD, AND STORAGE MEDIUM

CROSS-REFERENCE TO RELATED APPLICATION

This application is based upon and claims the benefit of priority from Japanese Patent Application No. 2018-186862, filed Oct. 1, 2018, the entire content of which is incorporated herein by reference.

BACKGROUND

Field of the Invention

The present invention relates to a display device, a display control method, and a storage medium.

Description of Related Art

In the related art, head-up display devices (hereinafter referred to as HUD devices) displaying images related to basic information for drivers on front windshields are known (for example, see Japanese Unexamined Patent Application, First Publication No. 2017-91115). When various marks indicating obstacles, alerts, and travel directions are displayed using the HUD devices to overlap scenery in front of vehicles, drivers can comprehend the various kinds of displayed information while maintaining directions of visual lines to the side in front at the time of driving.

SUMMARY

In the technology of the related art, however, to overlap an image with scenery for display, light is projected to an object that has a light transmission property, such as a front windshield. Then, a phenomenon called a double image in which two images with different luminance overlap each other occurs and visibility of the images deteriorates in some cases.

The present invention is devised in view of such circumstances and an object of the present invention is to provide a display device, a display control method, and a storage medium capable of improving visibility of an image.

A display device, a display method, a display control method, and a storage medium according to the present invention adopt the following configurations.

(1) According to an aspect of the present invention, a display device is provided, including: a light projection device configured to project light including an image; an optical mechanism provided on a path of the light and configured to be able to adjust an optical distance between a predetermined position and a position at which the light is formed as a virtual image; a concave mirror configured to reflect light passing through the optical mechanism toward a reflector; a first actuator configured to adjust the optical distance; a second actuator configured to adjust a reflection angle of the concave mirror; and a control device configured to determine a target optical distance and a target reflection angle based on a vehicle state or a situation around a vehicle, control the first actuator such that the optical distance approaches the target optical distance, and control the second actuator such that the reflection angle approaches the target reflection angle. The control device performs predetermined control such that the virtual image becoming a double image when the target optical distance is equal to or less than a predetermined distance is curbed.

(2) In the control device according to the aspect (1), the control device may cause the optical distance to approach the target optical distance within a predetermined distance range that includes a distance upper limit and a distance lower limit. In a second case in which the target optical distance is equal to or less than the predetermined distance and brightness around the vehicle is less than a threshold, the control device may control the first actuator such that the distance lower limit is greater than in a first case in which the target optical distance exceeds the predetermined distance, as the predetermined control.

(3) In the control device according to the aspect (1) or (2), the control device may cause the optical distance to approach the target optical distance within the predetermined distance range that includes the distance upper limit and the distance lower limit. In a third case in which the target optical distance is equal to or less than the predetermined distance, the brightness around the vehicle is less than the threshold, and the target optical distance is shorter than the distance lower limit, the control device may control the second actuator such that a degree of increase in the reflection angle is greater than in the first case in which the target optical distance exceeds the predetermined distance, as the predetermined control.

(4) In the control device according to any one of the aspects (1) to (3), the control device may cause the optical distance to approach the target optical distance within the predetermined distance range that includes the distance upper limit and the distance lower limit. In the third case in which the target optical distance is equal to or less than the predetermined distance, the brightness around a vehicle is less than the threshold, and the target optical distance is shorter than the distance lower limit, the control device may control the light projection device such that luminance of the image is less than in the first case in which the target optical distance exceeds the predetermined distance, as the predetermined control.

(5) According to another aspect of the present invention, a display control method is provided causing a computer of a display device including a light projection device configured to project light including an image, an optical mechanism provided on a path of the light and configured to be able to adjust an optical distance between a predetermined position and a position at which the light is formed as a virtual image, a concave mirror configured to reflect light passing through the optical mechanism toward a reflector, a first actuator configured to adjust the optical distance, and a second actuator configured to adjust a reflection angle of the concave mirror, to determine a target optical distance and a target reflection angle based on a vehicle state or a situation around a vehicle; to control the first actuator such that the optical distance approaches the target optical distance; to control the second actuator such that the reflection angle approaches the target reflection angle; and to perform predetermined control such that the virtual image becoming a double image when the target optical distance is equal to or less than a predetermined distance is curbed.

(6) According to still another aspect of the present invention, a computer-readable non-transitory storage medium is provided that stores a program causing a computer of a display device including a light projection device configured to project light including an image, an optical mechanism provided on a path of the light and configured to be able to adjust an optical distance between a predetermined position and a position at which the light is formed as a virtual image, a concave mirror configured to reflect light passing through the optical mechanism toward a reflector, a first actuator configured to adjust the optical distance, and a second actuator configured to adjust a reflection angle of the concave mirror, to determine a target optical distance and a target reflection angle based on a vehicle state or a situation around a vehicle; to control the first actuator such that the optical distance approaches the target optical distance; to control the second actuator such that the reflection angle approaches the target reflection angle; and to perform predetermined control such that the virtual image becoming a double image when the target optical distance is equal to or less than a predetermined distance is curbed.

According to the aspects (1) to (6), it is possible to improve visibility of an image.

DESCRIPTION OF EMBODIMENTS

Hereinafter, embodiments of a display device, a display control method, and a storage medium according to the present invention will be described with reference to the drawings. The display device is a device that is mounted in a vehicle (hereinafter referred to as a vehicle M) and enables human beings to see an image by overlapping the image on scenery. The display device is, for example, an HUD device. For example, the display device is a device that enables a viewer to see a virtual image by projecting light including an image to a front windshield of the vehicle M. The viewer is, for example, a driver of the vehicle M. The invention is not limited thereto and the display device may enable an occupant other than a driver (for example, an occupant or the like sitting in a front occupant seat) to see a virtual image.

In the following description, a positional relationship or the like will be described appropriately using the XYZ coordinate system. The Z direction represents a vertical direction, the X direction represents one direction of a horizontal plane orthogonal to the Z direction, and the Y direction represents the other direction of the horizontal plane. The Z direction represents a height direction of the vehicle M, the X direction represents a length direction of the vehicle M, and the Y direction represents a width direction of the vehicle M.

Overall Configuration

Figure 1:
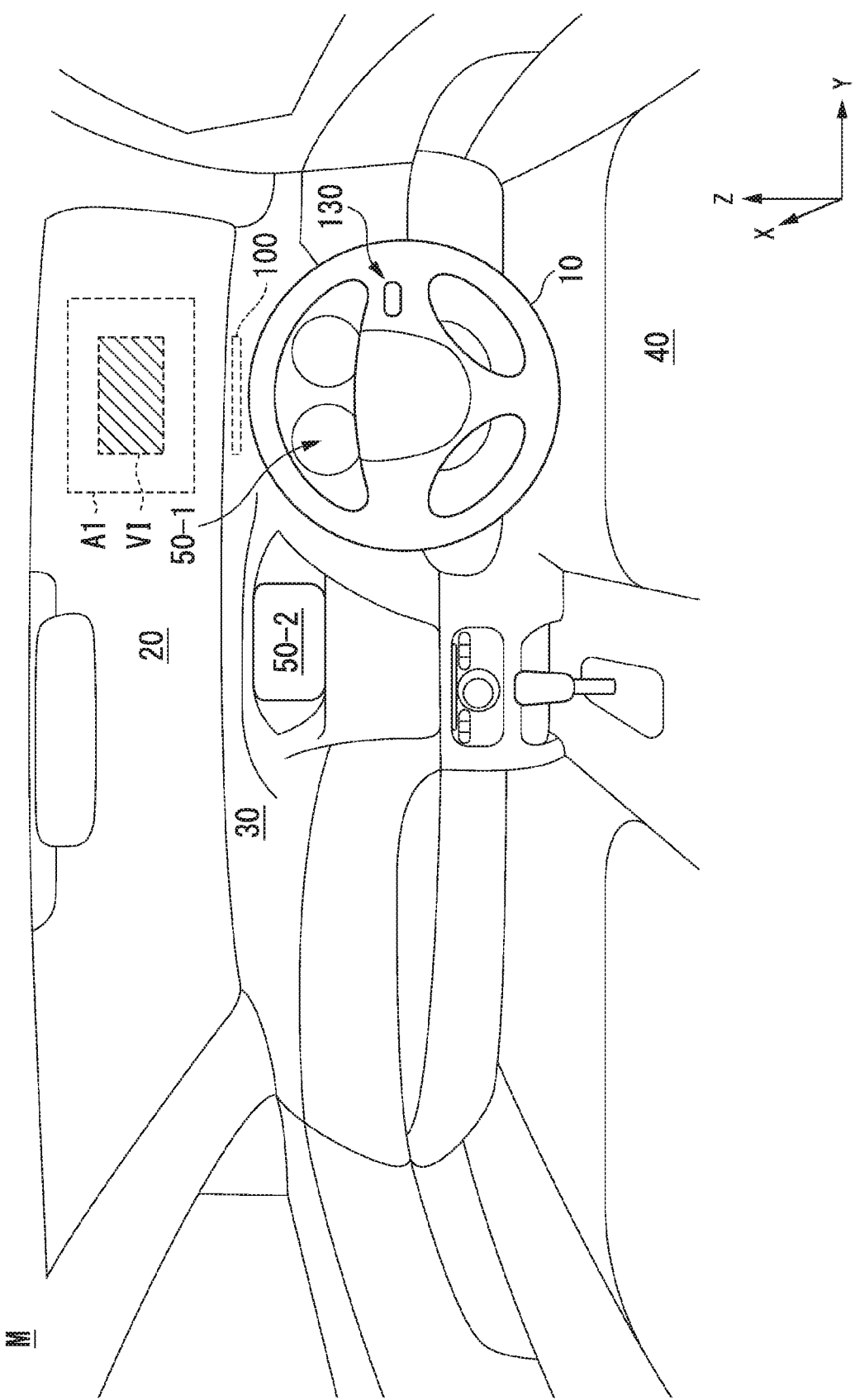
FIG. 1 is a diagram showing an exemplary configuration of a vehicle interior of a vehicle in which a display device is mounted according to an embodiment.

FIG. 1 is a diagram showing an exemplary configuration of a vehicle interior of the vehicle M in which a display device 100 is mounted according to an embodiment. The vehicle M includes, for example, a steering wheel 10 that controls steering of the vehicle M, a front windshield 20 that demarcates the vehicle exterior and the vehicle interior, and an instrument panel 30. The front windshield 20 is a member that has a light transmission property. The display device 100 enables a driver sitting on a driving seat to see a virtual image VI, for example, by projecting light including an image to a partial region (hereinafter referred to as a displayable region A1) of the front windshield 20 in front of the driving seat 40.

For example, the display device 100 enables the driver to see information for supporting driving of the driver as the virtual image VI. The information for supporting driving of the driver includes, for example, information such as a speed of the vehicle M, a driving force allocation ratio, the number of engine rotations, a driving state shift position of a driving support function, a sign recognition result, and an intersection position. The driving support function is, for example, adaptive cruise control (ACC), a lane keep assist system (LKAS), a collision mitigation brake system (CMBS), or a traffic jam assist function.

In addition to the display device 100, a second display 50-1 or a third display 50-2 may be provided in the vehicle M. The second display 50-1 is, for example, a display device that is provided near the front of the driving seat 40 in the instrument panel 30 and enables the driver to see from a gap in the steering wheel 10 or beyond the steering wheel 10. The third display 50-2 is mounted in, for example, the middle of the instrument panel 30. The third display 50-2 displays, for example, an image corresponding to a navigation process performed by a navigation device (not illustrated) mounted in the vehicle M or displays a video of a partner in a videophone. The third display 50-2 displays a television program, reproduces DVD, or displays content of a downloaded video or the like.

An operation switch 130 that receives an instruction to switch ON/OFF of display by the display device 100 or an instruction to adjust the position of the virtual image VI is provided in the vehicle M. The operation switch 130 is mounted at, for example, a position at which the driver sitting on the driving seat 40 can perform an operation without considerably changing his or her posture. For example, the operation switch 130 may be provided in front of the second display 50-1, may be provided in a protrusion (projection) portion of the instrument panel 30 in which the steering wheel 10 is provided, or may be provided in a spoke connecting the steering wheel 10 to the instrument panel 30.

Figure 2:
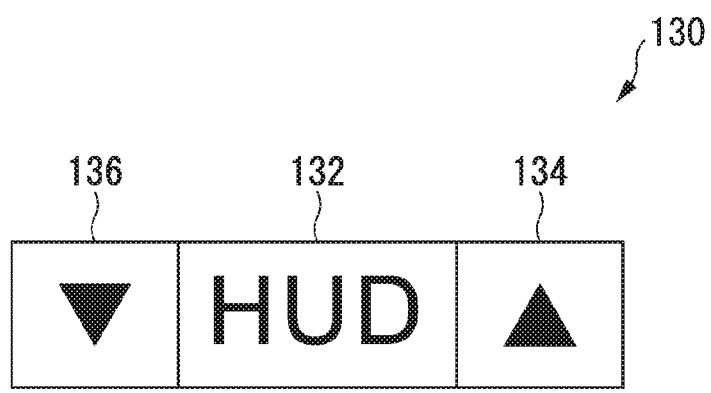
FIG. 2 is a diagram showing an operation switch according to the embodiment.

FIG. 2 is a diagram showing an operation switch 130 according to the embodiment. The operation switch 130 includes, for example, a main switch 132, a first adjustment switch 134, and a second adjustment switch 136. The main switch 132 is a switch that switches between ON/OFF of the display device 100.

The first adjustment switch 134 is a switch that receives an operation of moving the position of the virtual image VI to the upper side in the vertical direction Z (hereinafter referred to as an upward direction). The virtual image VI is, for example, a virtual image that the driver can see over the front windshield 20 to which an image is projected in a state in which the driver sits on the driving seat 40. The virtual image VI is displayed in the displayable region A1 just as if the image is in a space outside of the vehicle through the front windshield 20 when the driver sees the displayable region A1 from a visual line position P1 of the driver to be described below. The driver can continuously move a position at which the virtual image VI is seen in the upper direction within the displayable region A1, for example, by continuously pressing the first adjustment switch 134.

The second adjustment switch 136 is a switch that receives an operation of moving the position of the virtual image VI to a lower side (hereinafter referred to as a lower direction) in the vertical direction Z. The driver can continuously move a position at which the virtual image VI is seen in the lower direction within the displayable region A1 by continuously pressing the second adjustment switch 136.

The first adjustment switch 134 may be a switch that receives an operation of increasing luminance of the seen virtual image VI, instead of (or in addition to) the movement of the position of the virtual image VI in the upper direction. The second adjustment switch 136 may be a switch that receives an operation of decreasing luminance of the seen virtual image VI, instead of (or in addition to) the movement of the position of the virtual image VI in the lower direction. Content of instructions (content of a change in position or a change in luminance) received by the first adjustment switch 134 and the second adjustment switch 136 may be switched based on a certain (predetermined) operation. Such an operation is, for example, a long pressing operation of the main switch 132. The operation switch 130 may separately include, for example, a switch for receiving an operation of selecting display content or a switch for receiving an operation of adjusting luminance of the virtual image VI in addition to each switch illustrated in FIG. 2.

Figure 3:
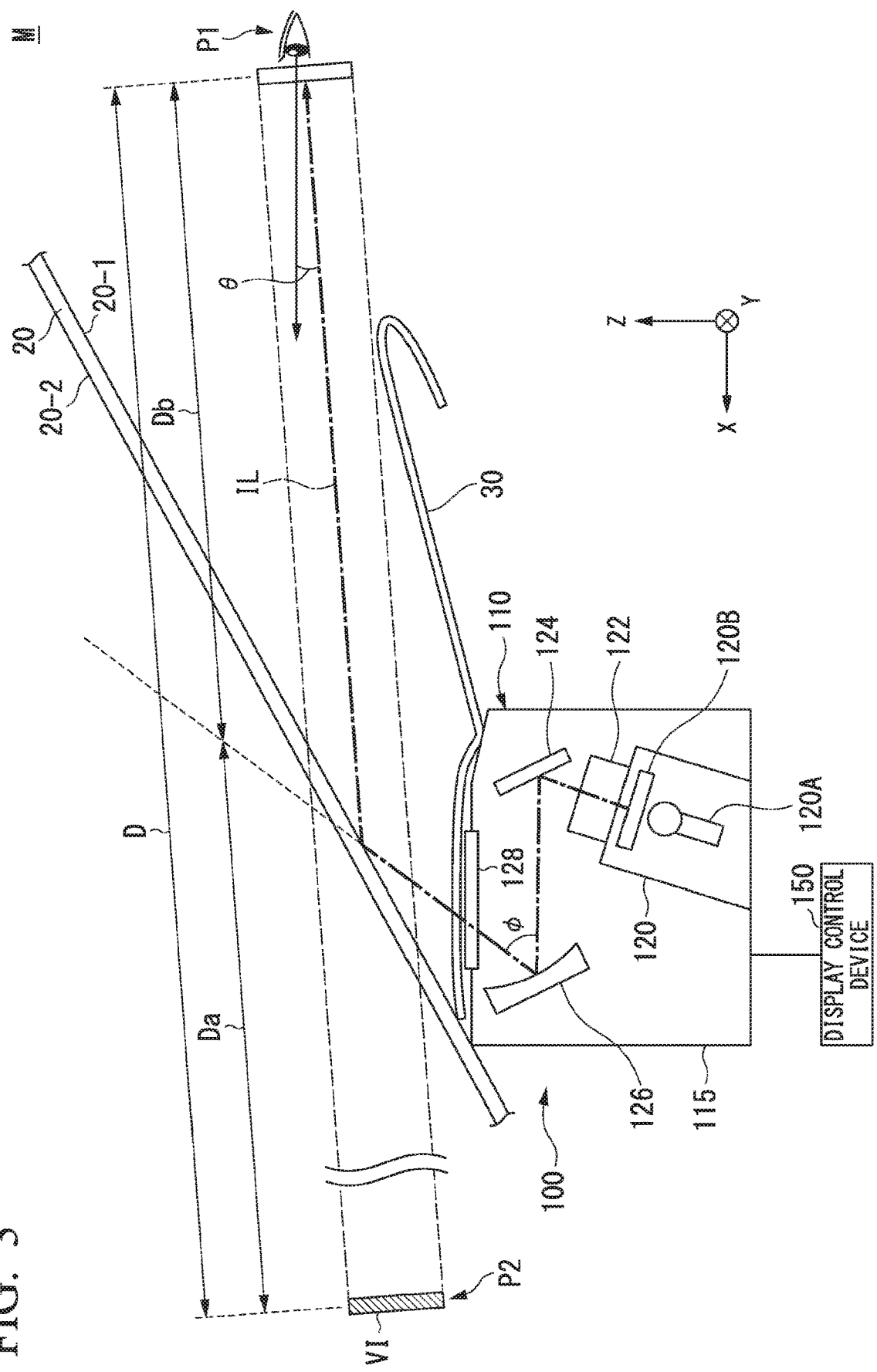
FIG. 3 is a diagram showing a partial configuration of the display device.

FIG. 3 is a diagram showing a partial configuration of the display device 100. The display device 100 includes, for example, a display 110 and a display control device 150. The display 110 accommodates, for example, a light projection device 120, an optical mechanism 122, a flat mirror 124, a concave mirror 126, and a light transmission cover 128 inside a casing 115. Additionally, the display device 100 includes various sensors and actuators, which will be described below.

The light projection device 120 includes, for example, a light source 120A and a display element 120B. The light source 120A is, for example, a cold cathode tube or a light-emitting diode and outputs visible light corresponding to the virtual image VI which the driver is able (allowed) to see. The display element 120B controls transmission of the visible light from the light source 120A. The display element 120B is, for example, a thin-film transistor (TFT) liquid crystal display device (LCD). The display element 120B includes image elements in the virtual image VI and determines a display aspect of the virtual image VI by controlling each of a plurality of pixels and controlling the degree of transmission of each color element of the visible light from the light source 120A. Hereinafter, the visible light including the image transmitted through the display element 120B is referred to as image light IL. The display element 120B may be an organic electro-luminescence (EL) display. In this case, the light source 120A may be omitted.

The optical mechanism 122 includes, for example, one or more lenses. The position of each lens can be adjusted in, for example, an optical axial direction. For example, the optical mechanism 122 is provided on a path of the image light IL output by the light projection device 120 and passes the image light IL incident from the light projection device 120 to emit the image light IL toward the front windshield 20. For example, the optical mechanism 122 can adjust a distance from the visual line position P1 of the driver to a formation position (an image-formed position at which the image light IL is formed as the virtual image VI) P2 at which the image light IL is formed as a virtual image VI by changing the position of the lens. Hereinafter, a distance from the position P1 to the position P2 is referred to as a virtual image seeing distance D in the description. The visual line position P1 of the driver is a position at which the image light IL reflected by the concave mirror 126 and the front windshield 20 is condensed. In this position, the eyes of the driver are assumed to be positioned. Strictly speaking, the virtual image seeing distance D is a distance of a line segment that has a slope in the vertical direction. In the following description, however, when "a virtual image seeing distance D of 7 [m]" is expressed, this distance may mean a distance in the horizontal direction.

The flat mirror 124 reflects the visible light (that is, the image light IL) emitted from the light source 120A and passing through the display element 120B toward the concave mirror 126.

The concave mirror 126 reflects the image light IL incident from the flat mirror 124 to reflect the image light IL toward the front windshield 20. The concave mirror 126 is supported to be rotatable about the Y axis, which is an axis in the width direction of the vehicle M.

The light transmission cover 128 is a member that has a light transmission property and is formed of, for example, a synthetic resin such as plastic. The light transmission cover 128 is provided to cover an opening formed in an upper surface of the casing 115. An opening or a member that has a light transmission property is also provided in the instrument panel 30. Thus, the light transmission cover 128 transmits the image light IL reflected by the concave mirror 126 to be incident on the front windshield 20, and suppresses penetration of foreign substances such as dust, dirt, or water drops into the casing 115.

The image light IL incident on the front windshield 20 is reflected by the front windshield 20 to be condensed at the visual line position P1 of the driver. At this time, when the eyes of the driver are located at the visual line position P1 of the driver, the driver feels as if an image pictured by the image light IL is displayed in front of the vehicle M.

When the image light IL reflected by the concave mirror 126 is incident on the front windshield 20, the image light IL is reflected by a front surface (a surface on the vehicle interior) 20-1 of the front windshield 20 and a rear surface (a surface of the vehicle exterior) 20-2 of the front windshield 20 since the front windshield 20 with a certain thickness has a light transmission property. In this case, a part of the virtual image VI of the image light IL reflected from the front surface 20-1 of the front windshield 20 (hereinafter referred to as a first virtual image VL) and a part of the virtual image VI of the image light IL reflected from the rear surface 20-2 of the front windshield 20 (hereinafter referred to as a second virtual image $VI_2$ overlap each other, and thus the overlapping first virtual image $VI_1$ and second virtual image $VI_2$ can be seen as a double image by the driver.

Figure 4:
FIG. 4 is a diagram showing an example of a virtual image in which a double image occurs.

FIG. 4 is a diagram showing an example of a virtual image VI in which a double image occurs. As illustrated, for example, when the light projection device 120 outputs an image including text or the like as the image light IL, the first virtual image VL is formed by condensing the image light IL reflected by the front surface 20-1 of the front windshield 20 into the visual line position P1 of the driver and the second visual image $VI_2$ is formed by condensing the image light IL reflected by the rear surface 20-2 of the front windshield 20 into the visual line position P1 of the driver. As exemplified in HG. 3, since the image light IL reflected by the concave mirror 126 is incident from the lower side on the front windshield 20 sloped in the horizontal direction (the X direction), a reflection point of the image light IL on the rear surface 20-2 of the front windshield 20 is located on the upper side of the reflection point of the image light IL on the front surface 20-1. As a result, the second virtual image $VI_2$ is shifted to be formed on the upper side of the first virtual image $VI_1$. Because of a difference in refractive index between the front windshield 20 and the air inside the vehicle, luminance of the second virtual image $VI_2$ is less than that of the first virtual image $V_1$. That is, the second virtual image $VI_2$ is displayed in a state in which a background is further transmitted than the first virtual image $VI_1$.

Figure 5:
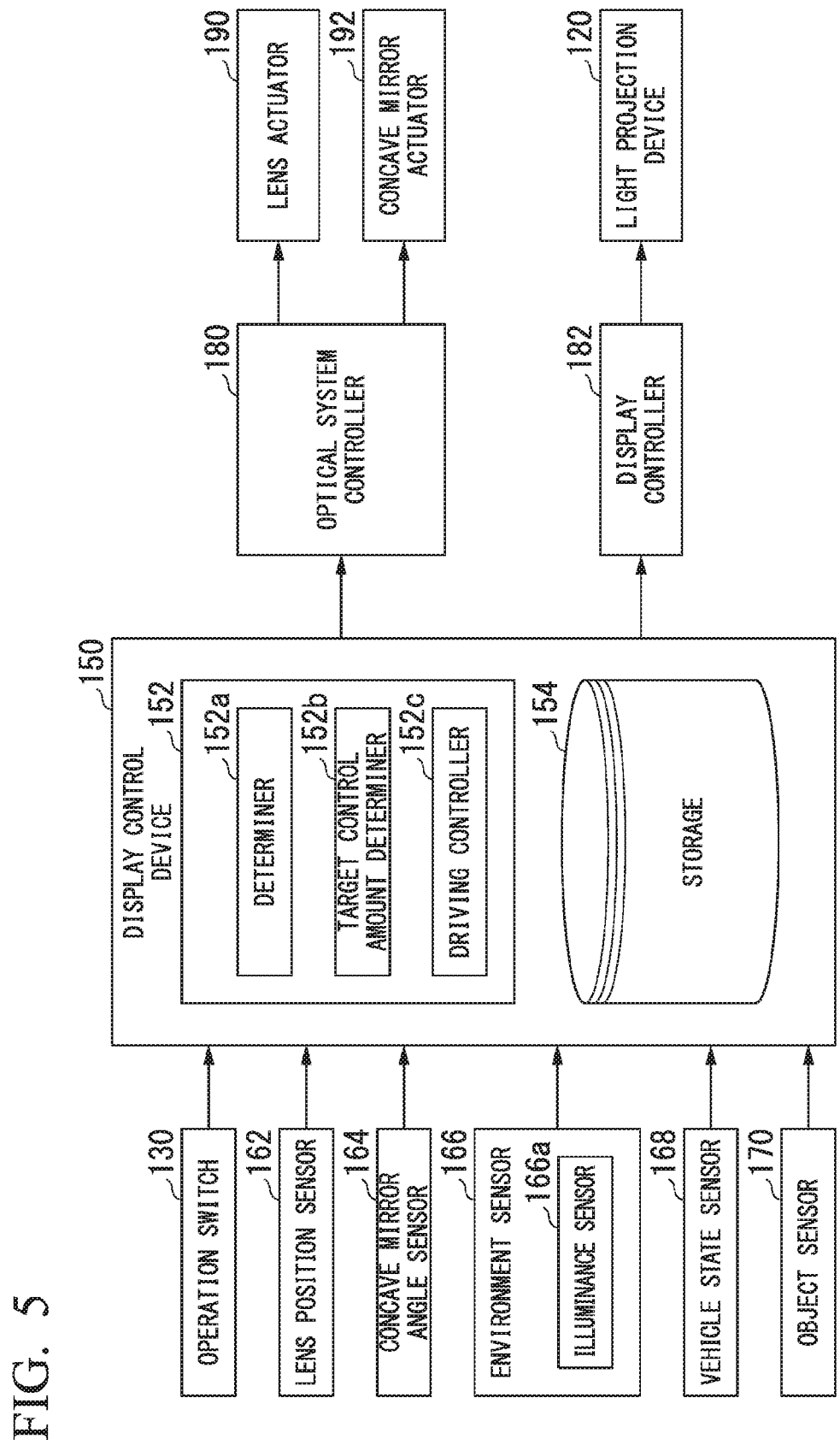
FIG. 5 is a diagram showing a configuration example of the display device centering on a display control device.

The display control device 150 controls display of the virtual image VI that is seen by the driver. FIG. 5 is a diagram showing a configuration example of the display device 100 centering on the display control device 150. The display device 100 includes a lens position sensor 162, a concave mirror angle sensor 164, an environment sensor 166, a vehicle state sensor 168, an object sensor 170, an optical system controller 180, a display controller 182, a lens actuator 190, and a concave mirror actuator 192 in addition to the light projection device 120, the operation switch 130, and the display control device 150. The lens actuator 190 is an example of a "first actuator" and the concave mirror actuator 192 is an example of a "second actuator."

The lens position sensor 162 detects the position of each lens included in the optical mechanism 122 and outputs a signal indicating a detection result to the display control device 150. The concave mirror angle sensor 164 detects a rotational angle around a rotational axis (Y axis) of the concave mirror 126 and outputs a signal indicating a detection result to the display control device 150.

The environment sensor 166 includes, for example, an illuminance sensor 166a. The illuminance sensor 166a detects illuminance LM inside or outside of the vehicle and outputs a signal indicating a detection result to the display control device 150.

For example, the vehicle state sensor 168 detects a speed of the vehicle M, detects acceleration, detects an angular velocity (yaw rate) around the vertical axis, or detects a direction of the vehicle M. The vehicle state sensor 168 outputs a signal indicating a detection result to the display control device 150.

The object sensor 170 includes, for example, a camera, a radar, or a light detection and ranging (LIDAR) finder and detects an object around the vehicle M. For example, the object sensor 170 detects, for example, four-wheeled auto cars, autobikes, bicycles, pedestrians, electric poles, guardrails, falling objects on roads, traffic signs, road marks, and mark lines. The object sensor 170 outputs a signal indicating a detection result to the display control device 150.

The display control device 150 includes, for example, a controller 152 and a storage 154. The controller 152 includes, for example, a determiner 152a, a target control amount determiner 152b, and a driving controller 152c. Constituent elements of the controller 152 are realized, for example, by causing a processor such as a central processing unit (CPU) or a graphics-processing unit (GPU) to execute a program (software). Some or all of the constituent elements may be realized by hardware (circuit unit including circuitry) such as a large-scale integration (LSI) circuit, an application-specific integrated circuit (ASIC), or a field-programmable gate array (FPGA) or may be realized by software and hardware in combination. The program referred to by the processor may be stored in advance in the storage 154 of the display control device 150 or may be stored in a storage medium such as a DVD or a CD-ROM which can be detachably mounted so that the storage medium is mounted on a drive device of the display control device 150 to be installed in the storage 154.

The storage 154 is realized by, for example, an HDD, a flash memory, an electrically-erasable programmable read-only memory (EEPROM), a read-only memory (ROM), or a random-access memory (RAM)). A non-transitory storage medium such as an HDD or a flash memory included in the storage 154 may be realized by another storage device such as a network attached storage (NAS) or an external storage server device connected via a network (for example, a wide area network). The storage 154 stores, for example, various process results in addition to programs read and executed by the processor.

The determiner 152a determines whether it is daytime or nighttime with reference to a signal indicating a detection result output by the illuminance sensor 166a. For example, the determiner 152a determines whether the illuminance LM (for example, a unit is [1×] or [1 m/m²]) detected by the illuminance sensor 166a is equal to or greater than a certain threshold (hereinafter referred to as an illuminance threshold $LM_{TH}$). When the illuminance LM is equal to or greater than the illuminance threshold $LM_{TH}$, daytime is determined. When the illuminance LM is less than the illuminance threshold $LM_{TH}$, nighttime is determined. An actual time may not necessarily be a time equivalent to daytime at a timing at which the illuminance LM is equal to or greater than the illuminance threshold $LM_{TH}$. When the periphery of the vehicle M is bright to the degree of brightness considered as daytime, daytime may be determined. The same applies to nighttime. That is, based on a detection result output by the illuminance sensor 166a, the determiner 152a determines whether the periphery of the vehicle M is bright to the degree of lightness considered as daytime or is dark to the degree of darkness considered as nighttime.

The target control amount determiner 152b determines a virtual image seeing distance set as a target (hereinafter referred to as a target virtual image seeing distance $D_{TA}$) and a dip angle set as a target (hereinafter a target dip angle $\theta_{TA}$) based on a detection result of the vehicle state sensor 168, a detection result of the object sensor 170, or the like.

The virtual image seeing distance D is an optical distance between the visual line position P1 of the driver and the formation position P2 at which the image light IL is formed as the virtual image VI, as described above. The virtual image seeing distance D is a distance obtained by adding a first distance Da to a second distance Db. As illustrated in FIG. 3, the first distance Da is a distance between a reflection point of the image light IL of the front windshield 20 and the visual line position P1 of the driver in a focal distance from reflection of the image light IL reflected by the concave mirror 126 by the front windshield 20 to condensation of the image light into the visual line position P1 of the driver. As illustrated in FIG. 3, the second distance Db is a distance between a reflection point of the image light IL of the front windshield 20 and the formation position P2 of the virtual image VI. The current virtual image seeing distance D is determined based on the position of the lens detected by the lens position sensor 162.

As illustrated in FIG. 3, the dip angle θ is an angle between the horizontal direction (the X direction) passing through the visual line position P1 of the driver and the visual line direction of the driver when the driver sees the virtual image VI. In other words, the dip angle θ is defined as an angle formed between a horizontal plane passing through the visual line position P1 of the driver and a line segment from the visual line position P1 of the driver to the formation position P2 of the virtual image VI. As the virtual image VI is formed on the lower side, that is, the visual line direction in which the driver sees the virtual image VI is lower, the dip angle θ increases. The current dip angle θ is determined based on a reflection angle φ of the concave mirror 126 detected by the concave mirror angle sensor 164. In other words, the dip angle θ is a control amount used to determine the reflection angle φ (an operation amount) of the concave mirror 126. As illustrated in FIG. 3, the reflection angle φ is an angle formed between a direction of incidence in which the image light IL reflected by the flat mirror 124 is incident on the concave mirror 126 and a reflection direction in which the concave mirror 126 reflects the image light IL.

For example, the target control amount determiner 152b determines the target virtual image seeing distance $D_{TA}$ and the target dip angle $θ_{TA}$ based on a speed of the vehicle M detected by the vehicle state sensor 168. The reflection angle φ of the concave mirror 126 determined in accordance with the target dip angle $θ_{TA}$ is an example of a "target reflection angle."

In general, in a situation in which a speed of the vehicle M decreases, the driver sees a space which is outside of the vehicle and is close to the vehicle M. In a situation in which a speed of the vehicle M increases, the driver tends to see a space which is outside of the vehicle and is distant from the vehicle M. That is, in a situation in which the speed of the vehicle M decreases, the driver easily sees the lower side of the displayable region A1. In a situation in which the speed of the vehicle M increases, the driver easily sees the upper side of the displayable region A1.

Accordingly, the target control amount determiner 152b may increase the target virtual image seeing distance $D_{TA}$ as the speed of the vehicle M increases and may shorten the target virtual image seeing distance $D_{TA}$ as the speed of the vehicle M deceases. The target control amount determiner 152b may determine a minimum distance to be described below as the target virtual image seeing distance $D_{TA}$ when the speed of the vehicle M is zero or is the degree of speed considered to be stopped.

The target control amount determiner 152b decreases the target dip angle $θ_{TA}$ as the speed of the vehicle M increases, and increases the target dip angle $θ_{TA}$ as the speed of the vehicle M decreases. In this way, by changing the target virtual image seeing distance $D_{TA}$ and the target dip angle $θ_{TA}$ in accordance with a speed of the vehicle M, the virtual image VI can be displayed at a destination of the visual line of the driver even when the driver changes a looking direction in accordance with the speed of the vehicle M.

The target control amount determiner 152b may determine the target virtual image seeing distance $D_{TA}$ and the target dip angle $θ_{TA}$ in accordance with a relative distance of the vehicle M to a front traveling vehicle (a preceding vehicle) detected by the object sensor 170, instead of or in addition to the determination of the target virtual image seeing distance $D_{TA}$ and the target dip angle $θ_{TA}$ in accordance with the speed of the vehicle M.

In general, when a rear bumper, a number plate, an indication lamp, a rear windshield, or the like is provided on the rear surface of a front traveling vehicle and the rear surface of the front traveling vehicle is ascertained as one scenery image, texture included in the scenery image tends not to be uniform or consistent. In this way, when the virtual image VI is overlapped on the rear surface of a front traveling vehicle on which texture is not uniform and diverse types of texture coexist, it is difficult to see details of the virtual image VI.

Accordingly, the target control amount determiner 152b determines, as the target dip angle $θ_{TA}$, an angle at which the virtual image VI does not overlap on the rear surface of a front traveling vehicle on which texture is complicated. More specifically, the target control amount determiner 152b determines the target dip angle $θ_{TA}$ so that the virtual image VI overlaps on a scenery image (for example, a road surface between the front traveling vehicle and the vehicle M) in which texture is assumed to be uniform or consistent. Thus, the virtual image VI is displayed at a position which is not overlapped on the rear surface of the front traveling vehicle. As a result, it is easy for the driver to see content of the virtual image VI.

The target control amount determiner 152b may determine the target virtual image seeing distance $D_{TA}$ and the target dip angle $θ_{TA}$ in accordance with a relative speed of the vehicle M to the front traveling vehicle, a time to collision (TTC) obtained by dividing a relative distance of the vehicle M to the front traveling vehicle by the relative speed of the vehicle M to the front traveling vehicle, or the like.

The driving controller 152c determines the virtual image seeing distance D and the dip angle θ instructed as control instruction values to the optical system controller 180 based on the target virtual image seeing distance $D_{TA}$ and the target dip angle $θ_{TA}$ determined by the target control amount determiner 152b, and outputs a control signal that includes the first control signal indicating the virtual image seeing distance D and the second control signal indicating the dip angle θ to the optical system controller 180. Hereinafter, the virtual image seeing distance D as a control instruction value is referred to as a control instruction distance $D_{CMD}$ and the dip angle θ as a control instruction value is referred to as a control instruction angle $θ_{CMD}$ for description.

For example, the driving controller 152c sets, as the control instruction distance $D_{CMD}$, a distance closest to the target virtual image seeing distance $D_{TA}$ in a predetermined distance range that includes a distance which is a certain upper limit (hereinafter referred to as a maximum distance $D_{MAX}$) and a distance which is a certain lower limit (hereinafter referred to as a minimum distance $D_{MIN}$).

The minimum distance $D_{MIN}$ and the maximum distance $D_{MAX}$ may be set as, for example, a minimum distance and a maximum distance which the optical mechanism 122 or the like can physically take or may be set as a distance in which allowance is made to some extent for the distances. For example, the minimum distance $D_{MIN}$ may be set to about 1 [m] and the maximum distance $D_{MAX}$ may be set to about 15 [m].

The driving controller 152c sets an angle closest to the target dip angle $θ_{TA}$ as the control instruction angle $θ_{CMD}$ in a predetermined angle range that includes an angle which is a certain upper limit (hereinafter referred to as a maximum angle $θ_{MAX}$) and an angle which is a certain lower limit (hereinafter referred to as a minimum angle $θ_{MIN}$). The minimum angle $\theta_{MIN}$ and the maximum angle $\theta_{MAX}$ may be set as, for example, a minimum angle and a maximum angle which the optical mechanism 122 or the like can physically take or may be set as an angle at which allowance is made to some extent for the angles.

Based on the target virtual image seeing distance $D_{TA}$ and the target dip angle $\theta_{TA}$ determined by the target control amount determiner 152b and the determination result by the determiner 152a, the driving controller 152c may determine the control instruction distance $D_{CMD}$ and the control instruction angle $\theta_{CMD}$ which are control instruction values so that the driver scarcely (barely) sees a double image of the virtual image VI or the driver does not mind the double image of the virtual image VI. Hereinafter, the determination of the control instruction values so that the driver scarcely sees a double image or does not mind the double image is referred to as double-image curbing control. The double-image curbing control is an example of "predetermined control."

The driving controller 152c may output a third control signal for changing the size of an image output by the light projection device 120 or changing the luminance of the image to the display controller 182.

The virtual image VI is an image displayed on the display element 120B and enlarged or reduced in accordance with the target virtual image seeing distance $D_{TA}$. When the target virtual image seeing distance $D_{TA}$ is set to be variable, the driver can see the virtual image VI with different sizes even when the size of the image (display region) displayed on the display element 120B is the same. Therefore, even when the target virtual image seeing distance $D_{TA}$ is changed, the driving controller 152c outputs the third control signal for displaying an image with a size in accordance with the target virtual image seeing distance $D_{TA}$ on the display element 120B to the display controller 182 in order to uniformly maintain the size of the virtual image VI seen by the driver.

The driving controller 152c may generate a control signal based on an operation on the operation switch 130 by the driver in addition to the generation of the control signal based on a detection result by the vehicle state sensor 168, a detection result by the object sensor 170, or the like.

For example, when the first adjustment switch 134 is operated, the driving controller 152c derives an angle designated by the driver based on an operation amount (the number of operations or an operation time) of the first adjustment switch 134 and determines an angle obtained by subtracting the derived angle (the angle designated by the driver) from a current dip angle $\theta$ as the target dip angle $\theta_{TA}$ in order to move the position of the virtual image VI in the upward direction within the displayable region A1. For example, when the second adjustment switch 136 is operated, the driving controller 152c derives an angle designated by the driver based on an operation amount (the number of operations or an operation time) of the second adjustment switch 136 and determines an angle obtained by adding the derived angle (the angle designated by the driver) to a current dip angle $\theta$ as the target dip angle $\theta_{TA}$ in order to move the position of the virtual image VI in the downward direction within the displayable region A1.

The optical system controller 180 drives the lens actuator 190 based on the first control signal included in the control signal output by the driving controller 152c. The lens actuator 190 includes a motor or the like and moves the position of a lens included in the optical mechanism 122 in an optical axis direction to adjust the virtual image seeing distance D.

For example, when the control instruction distance $D_{CMD}$ indicated by the first control signal is shorter than a current virtual image seeing distance D, the optical system controller 180 approaches the position of the lens to the side of the flat mirror 124 in the optical axis direction by driving the lens actuator 190. Thus, the second distance Db is decreased and the virtual image seeing distance D is decreased. As a result, the virtual image VI is seen as if the virtual image VI is at a farther location when seen from the driver.

When the control instruction distance $D_{CMD}$ indicated by the first control signal is longer than a current virtual image seeing distance D, the optical system controller 180 approaches the position of the lens to the side of the display element 120B in the optical axis direction by driving the lens actuator 190. Thus, the second distance Db is increased and the virtual image seeing distance D is increased. As a result, the virtual image VI is seen as if the virtual image VI is more nearby when seen from the driver.

The optical system controller 180 drives the concave mirror actuator 192 based on the second control signal included in the control signal output by the driving controller 152c. The concave mirror actuator 192 includes a motor or the like, rotates the concave mirror 126 around the rotational axis (the Y axis) to adjust the reflection angle $\phi$ of the concave mirror 126.

For example, when the control instruction angle $\theta_{CMD}$ indicated by the second control signal is less than a current dip angle $\theta$, the optical system controller 180 decreases the reflection angle of the concave mirror 126 by driving the concave mirror actuator 192. As illustrated in FIG. 3, the image light IL reflected by the concave mirror 126 is incident from the lower side on the front windshield 20 sloped in the horizontal direction (the X direction). Therefore, when the reflection angle of the concave mirror 126 decreases, the image light IL is incident on the upper end side (the upper side in the Z direction) of the front windshield 20. In this case, the reflection point of the image light IL in the front windshield 20 is moved to the upper end side (the upper side in the Z direction) of the front windshield 20. As a result, the virtual image VI formed on an extension line of a line connecting the visual line position P1 of the driver to the reflection point is moved in the upward direction in the displayable region A1.

For example, when the control instruction angle $\theta_{CMD}$ indicated by the second control signal is greater than the current dip angle $\theta$, the optical system controller 180 increases the reflection angle of $\phi$ the concave mirror 126 by driving the concave mirror actuator 192. Thus, the reflection point of the image light IL in the front windshield 20 is moved to the lower end side (the lower side in the Z direction) of the front windshield 20. As a result, the virtual image VI formed on an extension line of a line connecting the visual line position P1 of the driver to the reflection point is moved in the downward direction in the displayable region A1.

For example, the display controller 182 causes the display element 120B of the light projection device 120 to change the size of the image based on the third control signal output by the driving controller 152c. For example, the display controller 182 causes the display element 120B to change a resolution of the image to change the size of the image. Thus, a relative size of the virtual image VI to the displayable region A1 is changed.

Figure 6:
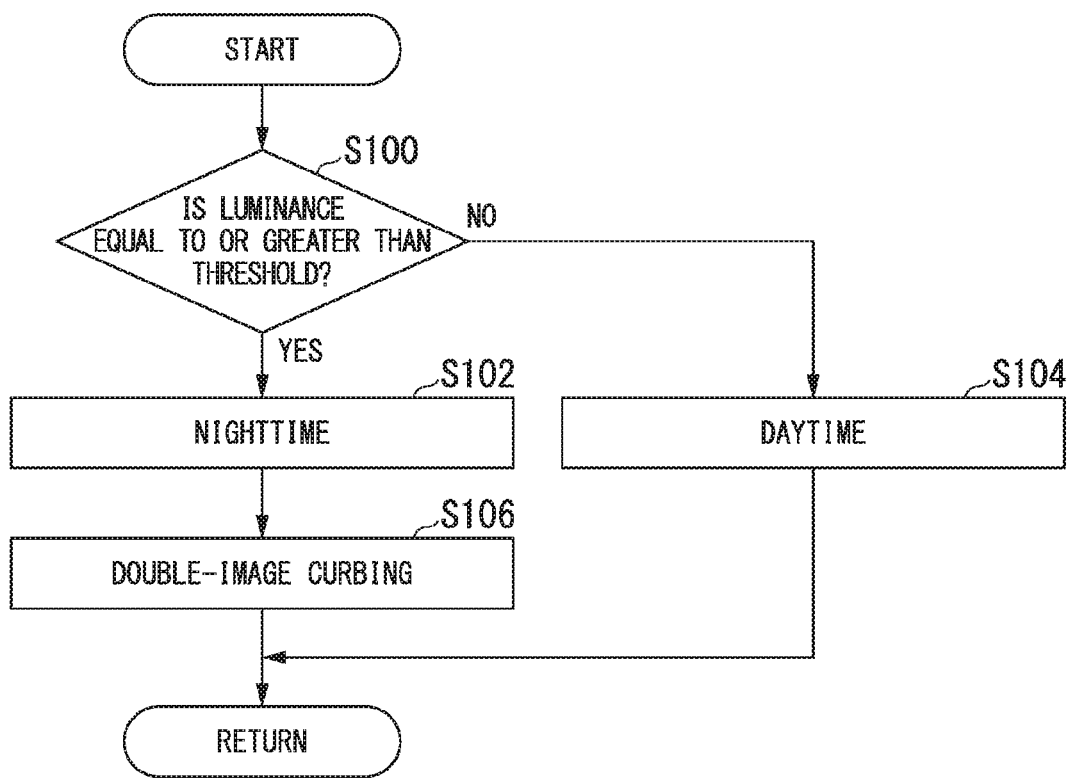
FIG. 6 is a flowchart showing an example of a series of processes of the display control device.

Hereinafter, a series of processes of the display control device 150 will be described with reference to a flowchart. FIG. 6 is a flowchart showing an example of the series of processes of the display control device 150. For example, the processes of the flowchart may be performed repeatedly at a predetermined period.

First, the determiner 152a determines whether the illuminance LM detected by the illuminance sensor 166a is equal to or greater than the illuminance threshold $LM_{TH}$ (step S100).

When the illuminance LM is equal to or greater than the illuminance threshold $LM_{TH}$, the determiner 152a determines daytime (step S102). When the illuminance LM is less than the illuminance threshold LW)), the determiner 152a determines nighttime (step S104).

When the determiner 152a determines nighttime, the driving controller 152c performs double-image curbing control (step S106).

For example, in a case in which the determiner 152a determines nighttime and the target virtual image seeing distance $D_{TA}$ determined by the target control amount determiner 152b is equal to or less than a predetermined distance $D_{Th}$ (an example of a "first case"), the driving controller 152c sets the minimum distance $D_{MIN}$ that is a lower limit of a distance range which can be set as a virtual image seeing distance D to be greater than in a case in which the target virtual image seeing distance $D_{TA}$ exceeds the predetermined distance $D_{Th}$ (an example of a "second case"), as the double-image curbing control.

The predetermined distance $D_{Th}$ is set to a distance, for example, when a plurality of drivers take a trial ride on the vehicle M in which the display device 100 is mounted and most of the plurality of driversare reported not to notice or mind the occurrence of a double image while the virtual image seeing distance D is sequentially changed during the trial ride. "Most of the plurality of drivers" may be more than half of the drivers reported not noticing or minding the occurrence of a double image among the total number of drivers. For example, the predetermined distance Dm is set to a distance of about 7 [m]. In this case, it may be considered that the drivers do not notice a double image when the virtual image seeing distance D is equal to or greater than 7 [m]. It may be considered that the drivers notice a double image when the virtual image seeing distance D is less than 7 [m]. The numerical value of 7 [m] is merely exemplary. When the configuration of the display device 100 and the kind of vehicle M in which the display device 100 is mounted, the shape of the front windshield 20, or the like is changed, the plurality of drivers may take a trial ride again and opinions of the plurality of drivers may be processed statistically to be appropriately changed.

Figure 7:
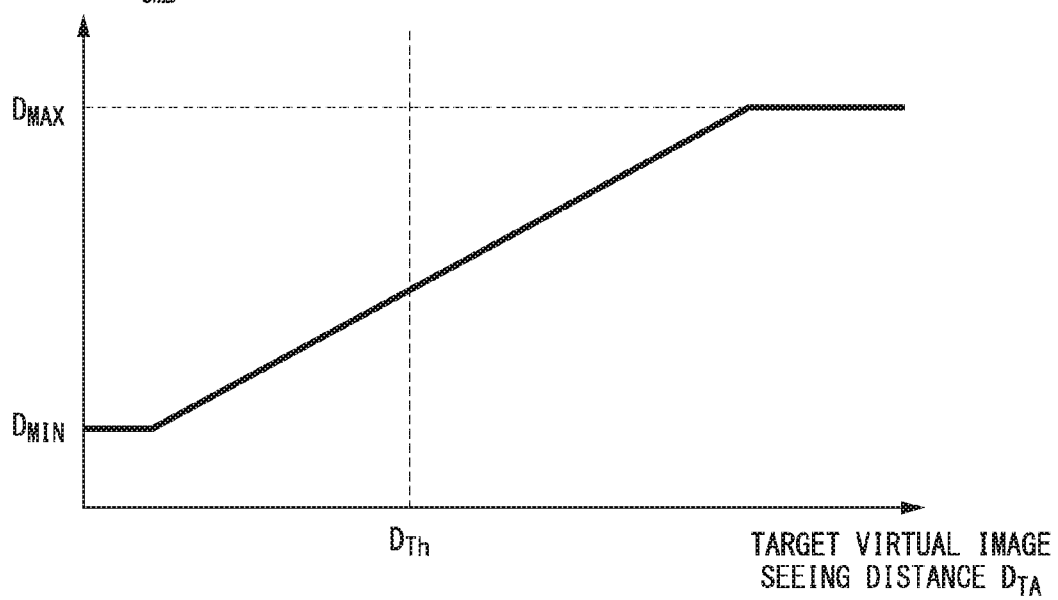
FIG. 7 is a diagram showing an example of a relationship between a control instruction distance and a target virtual image view distance in daytime.
Figure 8:
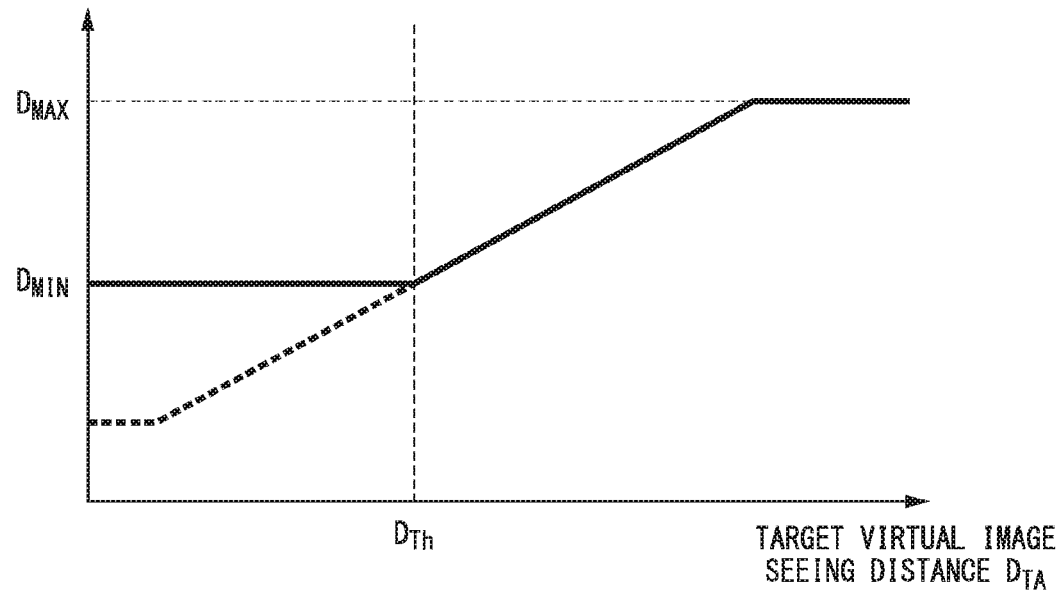
FIG. 8 is a diagram showing an example of a relationship between a control instruction distance and a target virtual image view distance at nighttime.

FIG. 7 is a diagram showing an example of a relationship between the control instruction distance $D_{CMD}$ and the target virtual image view distance $D_{TA}$ in daytime. FIG. 8 is a diagram showing an example of a relationship between the control instruction distance $D_{CMD}$ and the target virtual image view distance $D_{TA}$ at nighttime. As exemplified in FIG. 7, when the determiner 152a determines daytime, the driving controller 152c determines the same value as the target virtual image seeing distance $D_{TA}$ for the control instruction distance $D_{CMD}$ in a range from the minimum distance $D_{MIN}$ to the maximum distance $D_{MAX}$.

Conversely, as exemplified in FIG. 8, when the determiner 152a determines nighttime, the driving controller 152c changes the minimum distance $D_{MIN}$ to the predetermined distance $D_{Th}$ and determines the same value as the target virtual image seeing distance $D_{TA}$ for the control instruction distance $D_{CMD}$ in a range from the changed minimum distance $D_{MIN}$ to the maximum distance $D_{MAX}$. Thus, for example, the virtual image seeing distance D can be set to a distance equal to or greater than 7 [m] in which a driver scarcely notices a double image. Therefore, even when a double image occurs, the driver scarcely notices the double image, and thus it is possible to reduce a problem felt by the driver due to the occurrence of a double image.

For example, in a case in which the determiner 152a determines nighttime, the target virtual image seeing distance $D_{TA}$ determined by the target control amount determiner 152b is equal to or less than the predetermined distance $D_{Th}$, and the target virtual image seeing distance $D_{TA}$ is shorter than the minimum distance $D_{MIN}$ (an example of a "third case"), the driving controller 152c sets the degree of increase in the control instruction angle $θ_{CMD}$ to be greater than in the case in which the target virtual image seeing distance $D_{TA}$ exceeds the predetermined distance $D_{Th}$, as the double-image curbing control. That is, the driving controller 152c increases the degree of increase in the reflection angle φ of the concave mirror 126 as the double-image curbing control.

Figure 9:
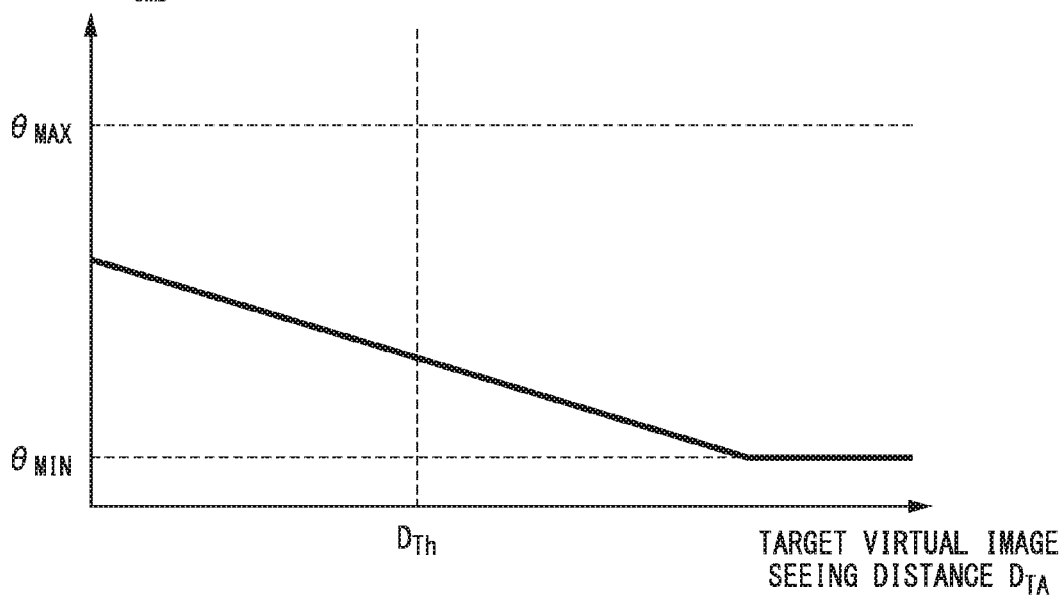
FIG. 9 is a diagram showing an example of a relationship between a control instruction angle and a target virtual image view distance in daytime.
Figure 10:
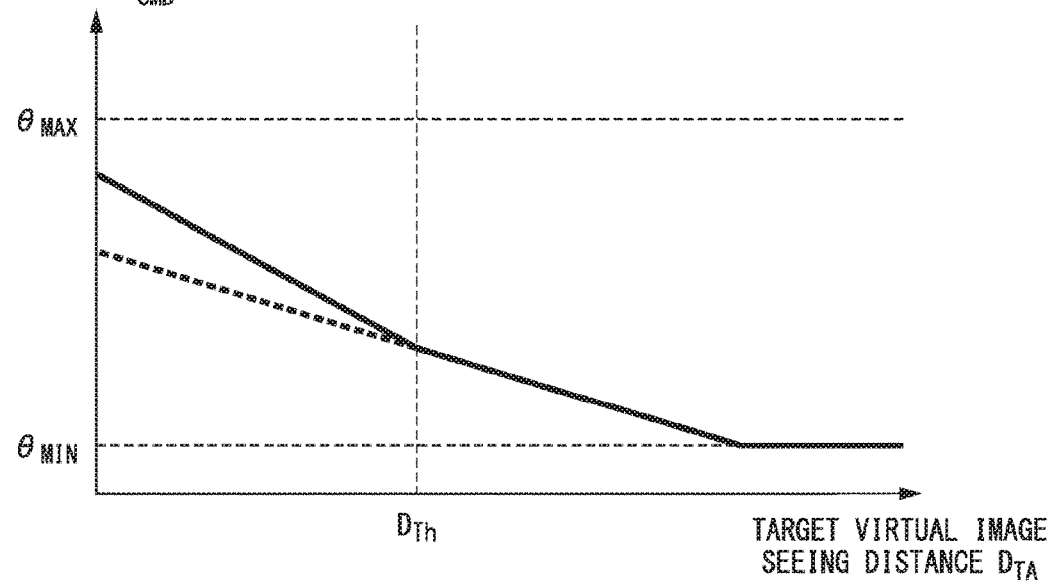
FIG. 10 is a diagram showing an example of a relationship between a control instruction angle and a target virtual image view distance at nighttime.

FIG. 9 is a diagram showing an example of a relationship between the control instruction angle $θ_{CMD}$ and the target virtual image view distance $D_{TA}$ in daytime. FIG. 10 is a diagram showing an example of a relationship between the control instruction angle $θ_{CMD}$ and the target virtual image view distance $D_{TA}$ at nighttime. The target virtual image seeing distance $D_{TA}$ increases or decreases with an opposite tendency (for example, an inverse proportion) to the target dip angle $θ_{TA}$. Therefore, the horizontal axis may be replaced with a negative target dip angle $θ_{TA}$ or a reciprocal of the target dip angle $θ_{TA}$. In FIG. 10, as exemplified in FIG. 8, it is assumed that the minimum distance $D_{MIN}$ is changed to the same value as the predetermined distance $D_{Th}$ in a region in which the target virtual image seeing distance $D_{TA}$ is equal to or less than the predetermined distance $D_{Th}$. That is, the target virtual image seeing distance $D_{TA}$ is inevitably shorter than the minimum distance $D_{MIN}$ in the region in which the target virtual image seeing distance $D_{TA}$ is equal to or less than the predetermined distance $D_{Th}$.

As exemplified in FIG. 9, when the determiner 152a determines daytime, the driving controller 152c determines the same value as the target dip angle $θ_{TA}$ for the control instruction angle $θ_{CMD}$ in a range from the minimum angle $θ_{MIN}$ to the maximum angle $θ_{MAX}$.

Conversely, as exemplified in FIG. 10, when the determiner 152a determines nighttime, the driving controller 152c determines the same value as the target dip angle $θ_{TA}$ for the control instruction angle $θ_{CMD}$ in the range from the minimum angle $θ_{MIN}$ to the maximum angle $θ_{MAX}$ in a region in which the target virtual image seeing distance $D_{TA}$ exceeds the predetermined distance Dm and determines the same value as a calculated value obtained by multiplying the target dip angle $θ_{TA}$ by a weight α or adding the weight α to the target dip angle $θ_{TA}$ as the control instruction angle $θ_{CMD}$ in the range from the minimum angle $θ_{MIN}$ to the maximum angle $θ_{MAX}$ in a region in which the target virtual image seeing distance $D_{TA}$ is equal to or less than the predetermined distance $D_{Th}$. Thus, in the region in which the target virtual image seeing distance $D_{TA}$ is equal to or less than the predetermined distance $D_{Th}$, an angle greater than the target dip angle $θ_{TA}$ is determined as the control instruction angle $θ_{CMD}$. As a result, in a case in which the control instruction distance $D_{CMD}$ is not equal to or less than the predetermined distance $D_{Th}$ in order for a driver to scarcely be able to see a double image when the control instruction distance $D_{CMD}$ has to be inherently equal to or less than the predetermined distance $D_{Th}$, a display position of the virtual image VI in the displayable region A1 can be moved in the downward direction by further increasing the dip angle θ.

As described above, when the target virtual image seeing distance $D_{TA}$ is equal to or less than the predetermined distance $D_{Th}$ at nighttime, the driving controller 152c determines the control instruction distance $D_{CMD}$ against the target virtual image seeing distance $D_{TA}$ as the double-image curbing control. Therefore, for example, the virtual image VI can be formed in a space in which there is a front object (for example, a front traveling vehicle or the like) and the virtual image VI can overlap the front to be seen. For example, when the front object is a front traveling vehicle, a driver feels just as if the virtual image VI is embedded in the front traveling vehicle since the texture of the rear surface of the front traveling vehicle is not uniform or consistent and diverse types of texture coexist.

Therefore, in order for the driver not to feel as if the virtual image VI is embedded in the front traveling vehicle, the target control amount determiner 152b overlaps the virtual image VI on a road surface or the like between the front traveling vehicle and the vehicle M by causing the control instruction angle $\theta_{CMD}$ to be greater than the target dip angle $\theta_{TA}$.

Figure 11:
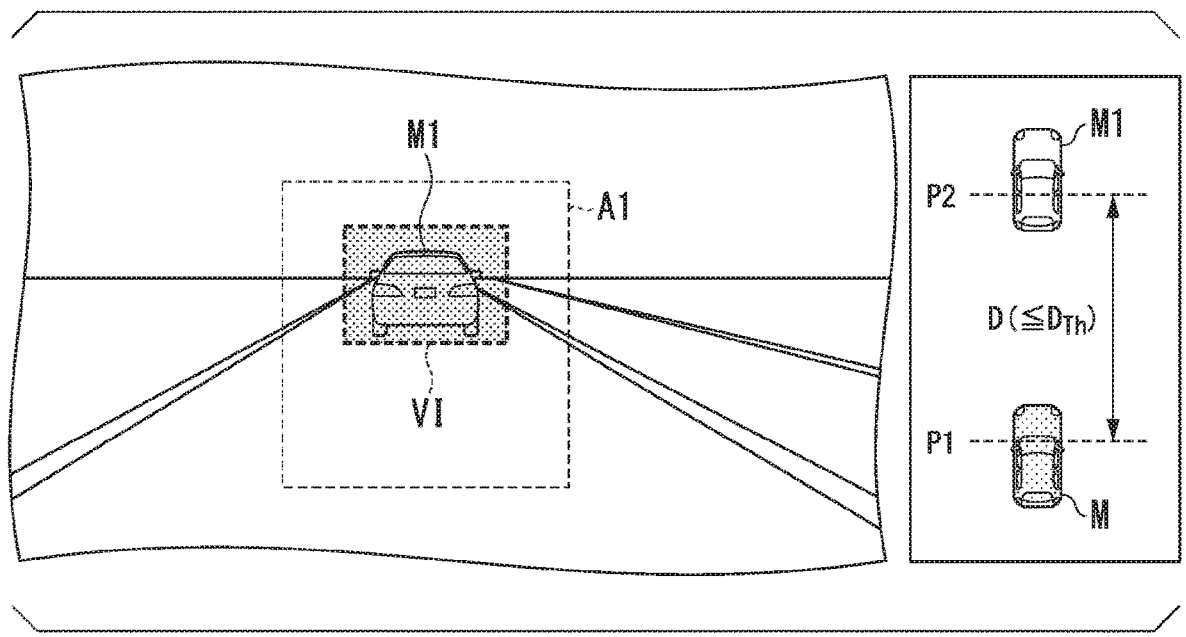
FIG. 11 is a diagram showing an example of a way of seeing a virtual image.
Figure 12:
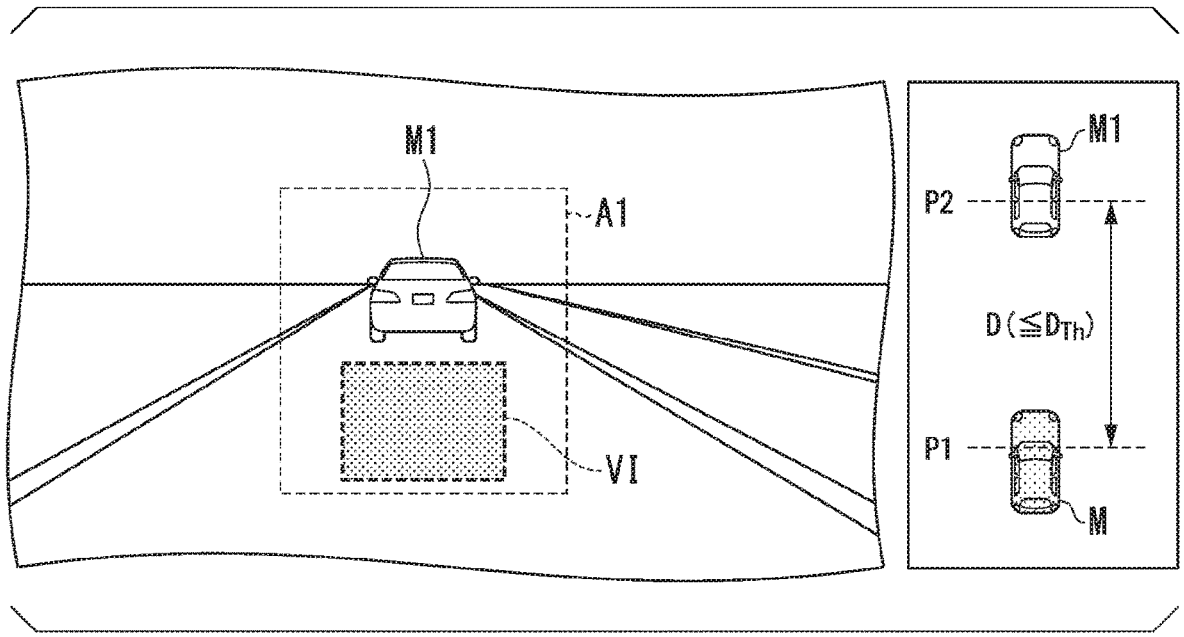
FIG. 12 is a diagram showing an example of a way of seeing a virtual image.

FIGS. 11 and 12 are diagrams showing examples of ways of seeing the virtual image VI. In the drawing, M1 indicates a front traveling vehicle. FIG. 11 illustrates a scenario in which the driving controller 152c sets the control instruction angle $\theta_{CMD}$ not to be greater than the target dip angle $\theta_{TA}$ in a situation in which the target virtual image seeing distance $D_{TA}$ is equal to or less than the predetermined distance $D_{Th}$. In such a scenario, the virtual image VI is displayed at a position overlapping the front traveling vehicle M1 within the displayable region A1. FIG. 12 illustrates a scenario in which the driving controller 152c sets the control instruction angle $\theta_{CMD}$ to be greater than the target dip angle $\theta_{TA}$ in a situation in which the target virtual image seeing distance $D_{TA}$ is equal to or less than the predetermined distance $D_{Th}$. In such a scenario, the virtual image VI is displayed at a position not overlapping the front traveling vehicle M1 within the displayable region A1.

For example, in a case in which the determiner 152a determines nighttime, the target virtual image seeing distance $D_{TA}$ determined by the target control amount determiner 152b is equal to or less than the predetermined distance $D_{Th}$, and the target virtual image setting distance $D_{TA}$ is shorter than the minimum distance $D_{MIN}$, the driving controller 152c may generate the third control signal to cause the luminance of the image to be less than the luminance of the image in the case in which the target virtual image seeing distance $D_{TA}$ exceeds the predetermined distance $D_{Th}$, as the double-image curbing control.

Figure 13:
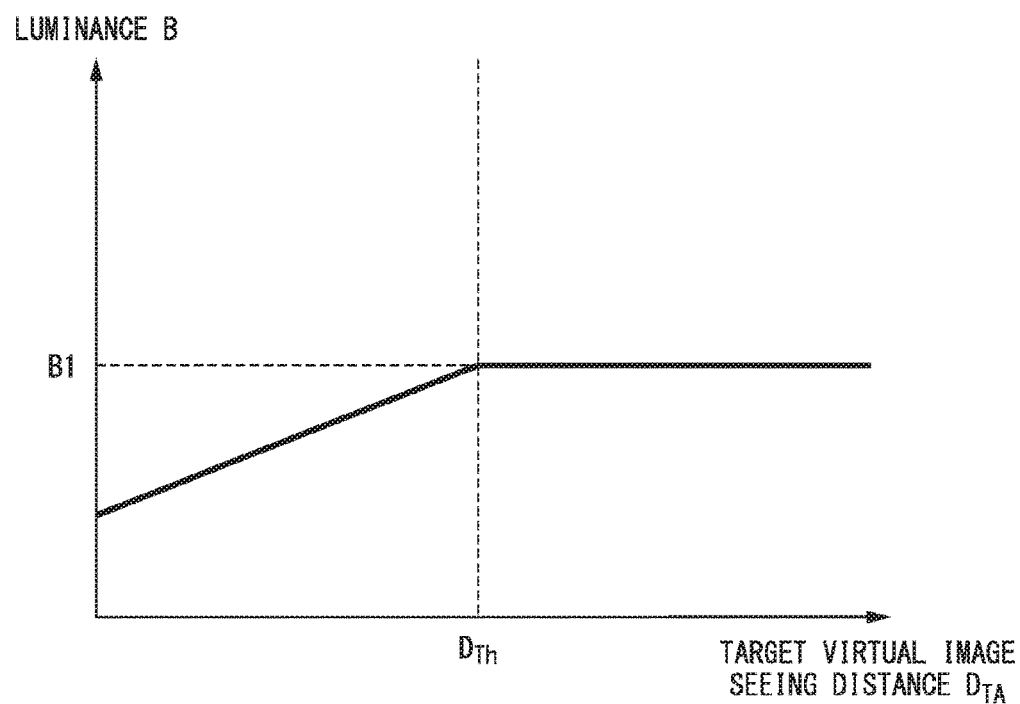
FIG. 13 is a diagram showing an example of a relationship between luminance of an image and a target virtual image view distance at nighttime.

FIG. 13 is a diagram showing an example of a relationship between luminance of an image and the target virtual view distance $D_{TA}$ at nighttime. As illustrated, for example, when the determiner 152a determines nighttime, the driving controller 152c sets the luminance of the image to a first luminance value B1 in the region in which the target virtual image seeing distance $D_{TA}$ exceeds the predetermined distance $D_{Th}$, and sets the luminance value of the image to decrease as the target virtual image setting distance $D_{TA}$ becomes shorter in the region in which the target virtual image seeing distance $D_{TA}$ is equal to or less than the predetermined distance $D_{Th}$. The first luminance value B1 may be equal to or less than the luminance of the image in daytime. Thus, when the virtual image seeing distance D is a distance in which it is easy to see a double image ($D_{TA} < D_{Th}$), luminance of the second virtual image $VI_2$ formed by the image light IL reflected by the rear surface 20-2 of the front windshield 20 can be decreased. Therefore, the driver can scarcely see the double image.

According to the above-described embodiment, the display device includes the light projection device 120 that projects the image light IL; the optical mechanism 122 that is provided on the path of the image light IL and is able to adjust the virtual image seeing distance D between the visual line position P1 of the driver and the formation position P2 of the virtual image VI; the concave mirror 126 that reflects light passing through the optical mechanism 122 toward the front windshield 20; the lens actuator 190 that adjusts the virtual image seeing distance D by moving the position of a lens included in the optical mechanism 122 in the optical axis direction; the target control amount determiner 152b that determines the target virtual image seeing distance $D_{TA}$ and the target dip angle $\theta_{TA}$ based on a detection result by the vehicle state sensor 168, a detection result by the object sensor 170, or the like; and the driving controller 152c that determines the control instruction distance $D_{CMD}$ in accordance with the target virtual image seeing distance $D_{TA}$ determined by the target control amount determiner 152b, determines the control instruction angle $\theta_{CMD}$ in accordance with the target dip angle $\theta_{TA}$, and outputs a control signal including a first control signal indicating the determined control instruction distance $D_{CMD}$ and a second control signal indicating the determined control instruction angle $\theta_{CMD}$ to the optical system controller 180. When the target virtual image seeing distance $D_{TA}$ is equal to or less than the predetermined distance $D_{Th}$, the driving controller 152c performs the double-image curbing control. Therefore, even when a double image occurs, the driver is scarcely able to notice the double image. As a result, it is possible to improve visibility of the image (the virtual image VI).

According to the above-described embodiment, in the case in which the target virtual image seeing distance $D_{TA}$ is equal to or less than the predetermined distance $D_{Th}$ when the control instruction distance $D_{CMD}$ is determined in accordance with the target virtual image seeing distance $D_{TA}$, the minimum distance $D_{MIN}$ of the distance range in which the control instruction distance $D_{CMD}$ can be taken is greater than in the case in which the target virtual image seeing distance $D_{TA}$ exceeds the predetermined distance $D_{Th}$, as the double-image curbing control. Therefore, the virtual image VI can be formed at a position separated from the visual line position P1 of the driver by the predetermined distance $D_{Th}$ or more. As a result, even when the double image occurs, most drivers who ride on the vehicle M do not mind the virtual image.

According to the above-described embodiment, in the case in which the target virtual image seeing distance $D_{TA}$ is equal to or less than the predetermined distance $D_{Th}$ and the target virtual image seeing distance $D_{TA}$ is shorter than the minimum distance $D_{MIN}$ when the control instruction distance $D_{CMD}$ is determined in accordance with the target virtual image seeing distance $D_{TA}$, the degree of increase in the control instruction angle $\theta_{CMD}$, that is, the degree of increase in the reflection angle ϕ of the concave mirror 126, is greater than in the case in which the target virtual image seeing distance $D_{TA}$ exceeds the predetermined distance $D_{Th}$, as the double-image curbing control. Therefore, it is possible to form the virtual image VI at a position not overlapping a front object of the vehicle M. As a result, the driver is scarcely able to feel as if the virtual image VI is embedded in the front object of the vehicle M.

According to the above-described embodiment, in the case in which the target virtual image seeing distance $D_{TA}$ is equal to or less than the predetermined distance $D_{Th}$ and the target virtual image seeing distance $D_{T4}$ is shorter than the minimum distance $D_{MIN}$ when the control instruction distance $D_{CMD}$ is determined in accordance with the target virtual image seeing distance $D_{T4}$, the luminance of the image is less than in the case in which the target virtual image seeing distance $D_{T4}$ exceeds the predetermined distance $D_{Th}$, as the double-image curbing control. Therefore, the driver is scarcely able to see the double image.

According to the above-described embodiment, the driving controller 152c performs the double-image curbing control when at least the determiner 152a determines nighttime, as described above. However, the present invention is not limited thereto. When the determiner 152a determines daytime, the driving controller 152c may perform the double-image curbing control.

The display device 100 may project an image to a combiner provided in front of the front windshield 20 when seen from the driver, instead of directly projecting the image to the front windshield 20. The combiner is a member that has a light transmission property and is, for example, a transparent plastic disc. The combiner is another example of a "reflector."

The display device 100 may project light to a display device that has a light transmission property and is mounted in front of, on the surface of, or inside the front windshield 20, instead of projecting the light to the front windshield 20. The display device that has the light transmission property includes, for example, a liquid crystal display or an organic EL display. The display device may project light to a transparent member (for example, a lens of glasses or a visor) included in a device worn on the body of a person.

The foregoing embodiment can be expressed as follows.

A display device includes: a light projection device configured to project light including an image; an optical mechanism provided on a path of the light and configured to be able to adjust an optical distance between a predetermined position and a position at which the light is formed as a virtual image; a concave mirror configured to reflect light passing through the optical mechanism toward a reflector; a first actuator configured to adjust the optical distance; a second actuator configured to adjust a reflection angle of the concave mirror; a storage configured to store a program; and a processor. By executing the program, the processor determines a target optical distance and a target reflection angle based on a vehicle state or a situation around a vehicle, controls the first actuator such that the optical distance approaches the target optical distance, controls the second actuator such that the reflection angle approaches the target reflection angle, and performs predetermined control such that the virtual image becoming a double image when the target optical distance is equal to or less than a predetermined distance is curbed.

While preferred embodiments of the invention have been described, the present invention is not limited to the embodiments and various modifications and substitutions can be added within the scope of the present invention without departing from the gist of the present invention.

What is claimed is:

1. A display device, comprising:
    a light projection device configured to project light including an image;
    an optical mechanism provided on a path of the light and configured to adjust an optical distance between a predetermined position and a position at which the light is formed as a virtual image;
    a concave mirror configured to reflect light passing through the optical mechanism toward a reflector;
    a first actuator configured to adjust the optical distance;
    a processor; and
    a memory that stores program instructions that, in response to execution by the processor, facilitate performance of operations, the operations comprising:
        determining a target optical distance based on a vehicle state or a situation around a vehicle,
        in response to determining that a brightness around the vehicle is equal to or greater than a threshold and the target optical distance is equal to or less than a predetermined distance, controlling the first actuator such that the optical distance approaches the target optical distance, and
        in response to determining that the brightness around the vehicle is less than the threshold and the target optical distance is equal to or less than the predetermined distance, controlling the first actuator such that the optical distance approaches the predetermined distance.

2. The display device according to claim 1, wherein the operations further comprise:
    in response to determining that the brightness around the vehicle is less than the threshold and the target optical distance is greater than the predetermined distance, keeping a brightness of the image constant regardless of the target optical distance, and
    in response to determining that the brightness around the vehicle is less than the threshold and the target optical distance is equal to or less than the predetermined distance, decreasing the brightness of the image as the target optical distance becomes shorter.

3. A display control method causing a computer of a display device including a light projection device configured to project light including an image, an optical mechanism provided on a path of the light and configured to adjust an optical distance between a predetermined position and a position at which the light is formed as a virtual image, a concave mirror configured to reflect light passing through the optical mechanism toward a reflector, and a first actuator configured to adjust the optical distance to
    determine a target optical distance based on a vehicle state or a situation around a vehicle,
    in response to a determination that a brightness around the vehicle is equal to or greater than a threshold and the target optical distance is equal to or less than a predetermined distance, control the first actuator such that the optical distance approaches the target optical distance, and
    in response to a determination that the brightness around the vehicle is less than the threshold and the target optical distance is equal to or less than the predetermined distance, control the first actuator such that the optical distance approaches the predetermined distance.

4. A display device, comprising:
    a light projection device configured to project light including an image;
    an optical mechanism provided on a path of the light and configured to adjust an optical distance between a predetermined position and a position at which the light is formed as a virtual image;
    a concave mirror configured to reflect light passing through the optical mechanism toward a reflector;
    a first actuator configured to adjust the optical distance;

a second actuator configured to adjust a reflection angle of the concave mirror;

a processor; and a memory that stores program instructions that, in response to execution by the processor, facilitate performance of operations, the operations comprising:

determining a target optical distance and a target reflection angle based on a vehicle state or a situation around a vehicle, controlling the first actuator such that the optical distance approaches the target optical distance, controlling the second actuator such that the reflection angle approaches the target reflection angle, and in a second case, controlling the second actuator such that a position of the virtual image is moved to a lower side in a vertical direction relative to a first case, wherein the first case is a determination that a brightness around the vehicle is equal to or greater than a threshold and the target optical distance is equal to or less than a predetermined distance, and the second case is a determination that the brightness around the vehicle is less than the threshold and the target optical distance is equal to or less than the predetermined distance.

5. The display device according to claim 4, wherein the operations further comprise:

keeping the brightness of the image constant regardless of the target optical distance in a third case comprising a determination that the brightness around the vehicle is less than the threshold and the target optical distance is greater than the predetermined distance, and decreasing the brightness of the image as the target optical distance becomes shorter in the second case.

* * * * *